(12) United States Patent
Krampotich et al.

(10) Patent No.: US 8,150,229 B2
(45) Date of Patent: Apr. 3, 2012

(54) REAR DRAWER LATCH

(75) Inventors: Dennis Krampotich, Shakopee, MN (US); Ryan Kostecka, Bernsville, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/460,034

(22) Filed: Jul. 9, 2009

(65) Prior Publication Data

US 2010/0014823 A1   Jan. 21, 2010

Related U.S. Application Data

(62) Division of application No. 12/082,299, filed on Apr. 8, 2008, now Pat. No. 7,567,744.

(60) Provisional application No. 60/933,562, filed on Jun. 6, 2007.

(51) Int. Cl.
*G02B 6/60* (2006.01)
(52) U.S. Cl. ........................................ 385/135; 385/136
(58) Field of Classification Search .................. 385/135, 385/136
See application file for complete search history.

(56) References Cited

U.S. PATENT DOCUMENTS

| | | | |
|---|---|---|---|
| 3,589,783 A * | 6/1971 | Studinski et al. ............. 312/127 |
| 3,602,564 A * | 8/1971 | Lewin ........................... 312/220 |
| 3,651,986 A * | 3/1972 | Karecki et al. .................. 221/12 |
| 3,782,800 A * | 1/1974 | Remington et al. .......... 312/333 |
| 4,494,806 A * | 1/1985 | Williams et al. .............. 312/333 |
| 4,679,950 A * | 7/1987 | Delmege et al. ................ 384/18 |
| 5,141,266 A * | 8/1992 | Braun et al. .................... 292/49 |
| 5,383,554 A * | 1/1995 | Cowan .......................... 206/310 |
| 5,723,850 A * | 3/1998 | Lambert ......................... 235/22 |
| 5,802,892 A * | 9/1998 | Cohn et al. ....................... 70/84 |
| 6,435,587 B1 * | 8/2002 | Flowerday et al. .......... 296/37.8 |
| 6,438,310 B1 * | 8/2002 | Lance et al. .................. 385/135 |
| 6,504,988 B1 | 1/2003 | Trebesch et al. |
| 7,079,744 B2 | 7/2006 | Douglas et al. |
| 7,171,099 B2 | 1/2007 | Barnes et al. |
| 7,567,744 B2 | 7/2009 | Krampotich et al. |
| 2002/0124779 A1 * | 9/2002 | Perkins .......................... 109/47 |
| 2007/0031099 A1 | 2/2007 | Herzog et al. |
| 2008/0085092 A1 | 4/2008 | Barnes |
| 2009/0021129 A1 | 1/2009 | Hu et al. |

* cited by examiner

*Primary Examiner* — K. Cyrus Kianni
(74) *Attorney, Agent, or Firm* — Merchant & Gould P.C.

(57) ABSTRACT

A cable management panel including a chassis and a drawer slidably mounted to the chassis. The panel includes a rear drawer latch assembly that automatically locks the drawer in the open position to prevent inadvertent closing movement of the drawer.

9 Claims, 6 Drawing Sheets

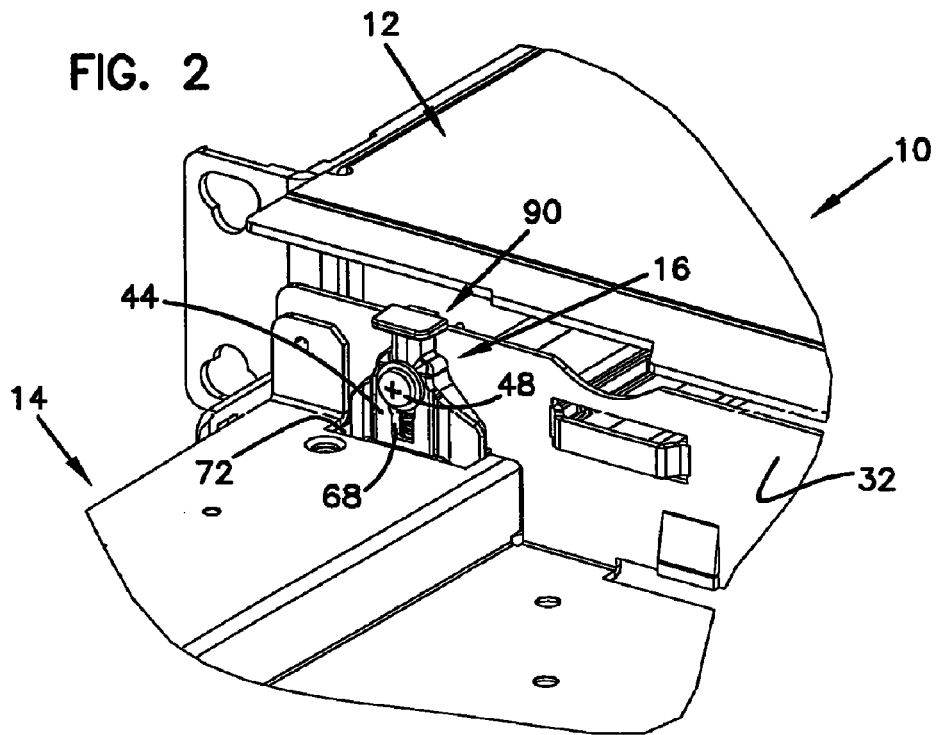
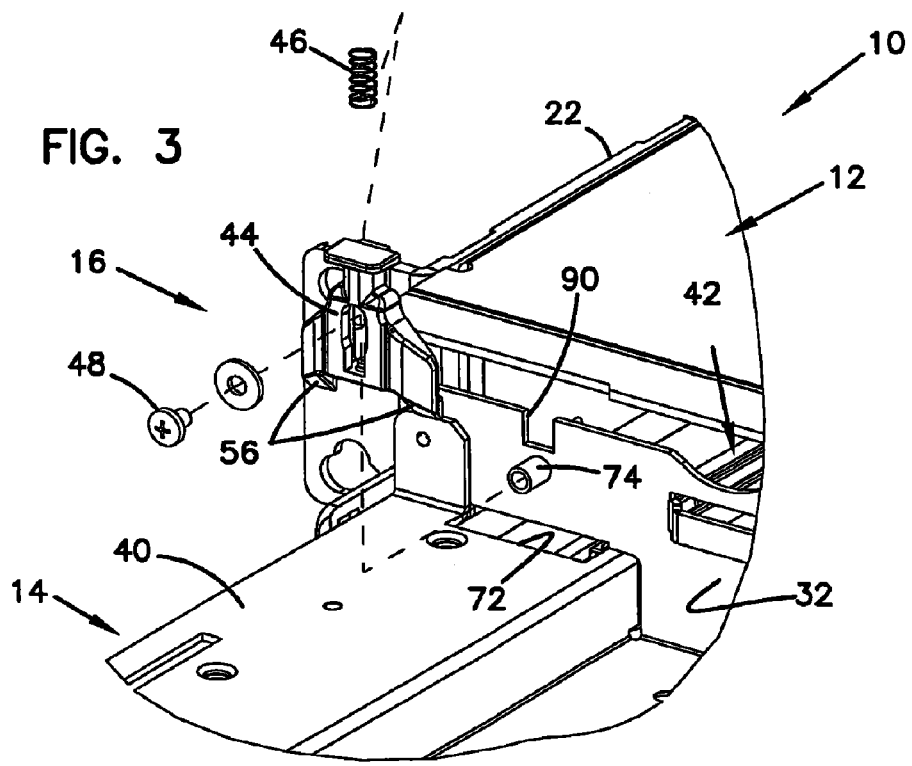

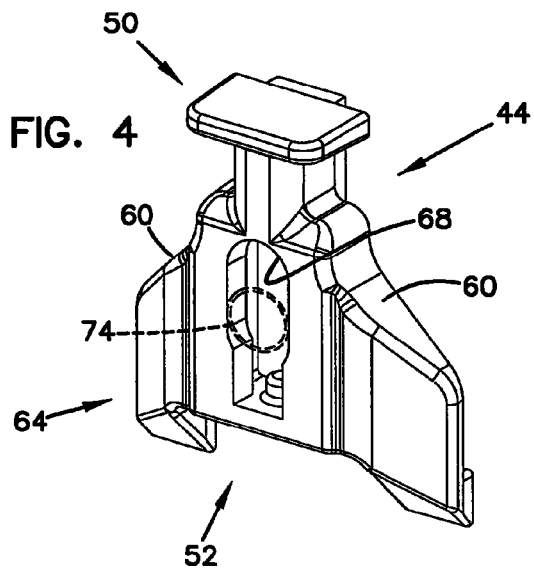
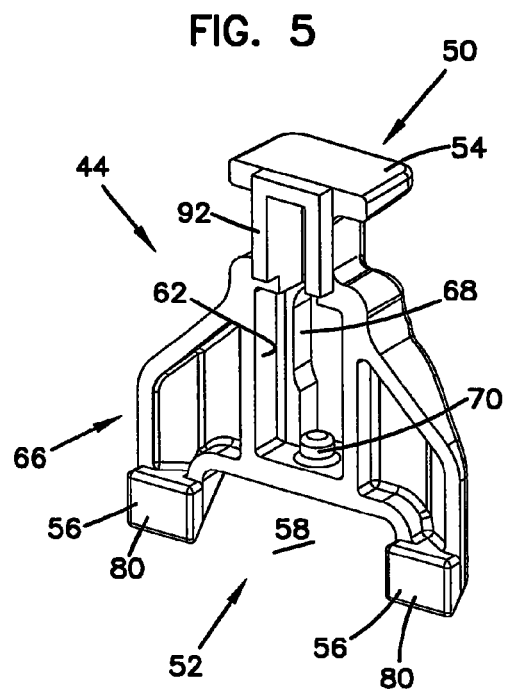
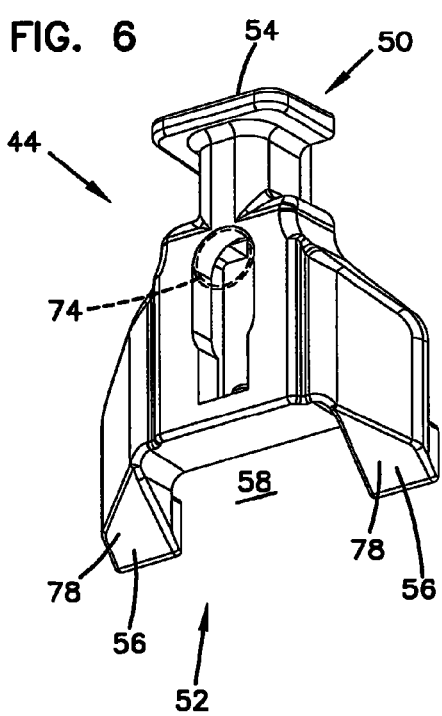
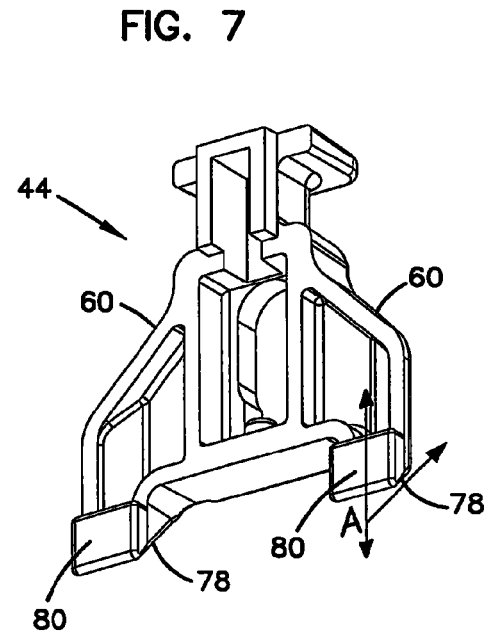

REAR DRAWER LATCH

CROSS-REFERENCE TO RELATED APPLICATIONS

This application is a divisional of U.S. application Ser. No. 12/082,299, filed Apr. 8, 2008 now U.S. Pat. No. 7,567,744; which application claims the benefit of U.S. Provisional Application Ser. No. 60/933,562, filed Jun. 6, 2007; which applications are incorporated herein by reference.

TECHNICAL FIELD

This disclosure relates generally to methods and devices for managing telecommunication cables. More particularly, this disclosure relates to a cable management panel having a sliding drawer for managing fiber optic cables.

BACKGROUND

Cable management arrangements for cable termination, splice, and storage come in many forms. One type of cable management arrangement used in the telecommunications industry includes a sliding drawer that can be installed on a telecommunication equipment rack. Such drawers provide organized, high-density, cable termination, splice, and storage in telecommunication infrastructures that often have limited space.

Access to the interior of sliding drawers is necessary during the original installation of cables/components and during subsequent adaptation or maintenance of the cables/components. Often times during the install or maintenance procedures, the drawers can inadvertently close or more rearward causing damage to unsecured cables and/or components. There is a continued need in the art for better cable management devices and arrangements to address concerns regarding the ease of use, for example, of such cable management arrangements.

SUMMARY OF THE INVENTION

One aspect of the present disclosure relates to a cable management panel having a releasable rear drawer latch assembly that prevents rearward movement of the drawer when the drawer is positioned in an open position. The rear drawer latch assembly includes a latch body that automatically moves from an unlocked position to a locked position when the drawer reaches the open position.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

BRIEF DESCRIPTION OF THE DRAWINGS

FIG. 2 is an enlarged, partial perspective view of the cable management panel of FIG. 1;

FIG. 3 is an exploded view of the rear drawer latch assembly shown in FIG. 2;

FIG. 4 is a front, top perspective view of the drawer latch of the rear drawer latch assembly of FIG. 1, shown in isolation;

FIG. 5 is a rear, top perspective view of the drawer latch of FIG. 4;

FIG. 6 is a front, bottom perspective view of the drawer latch of FIG. 5;

FIG. 7 is a rear, bottom perspective view of the drawer latch of FIG. 6;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
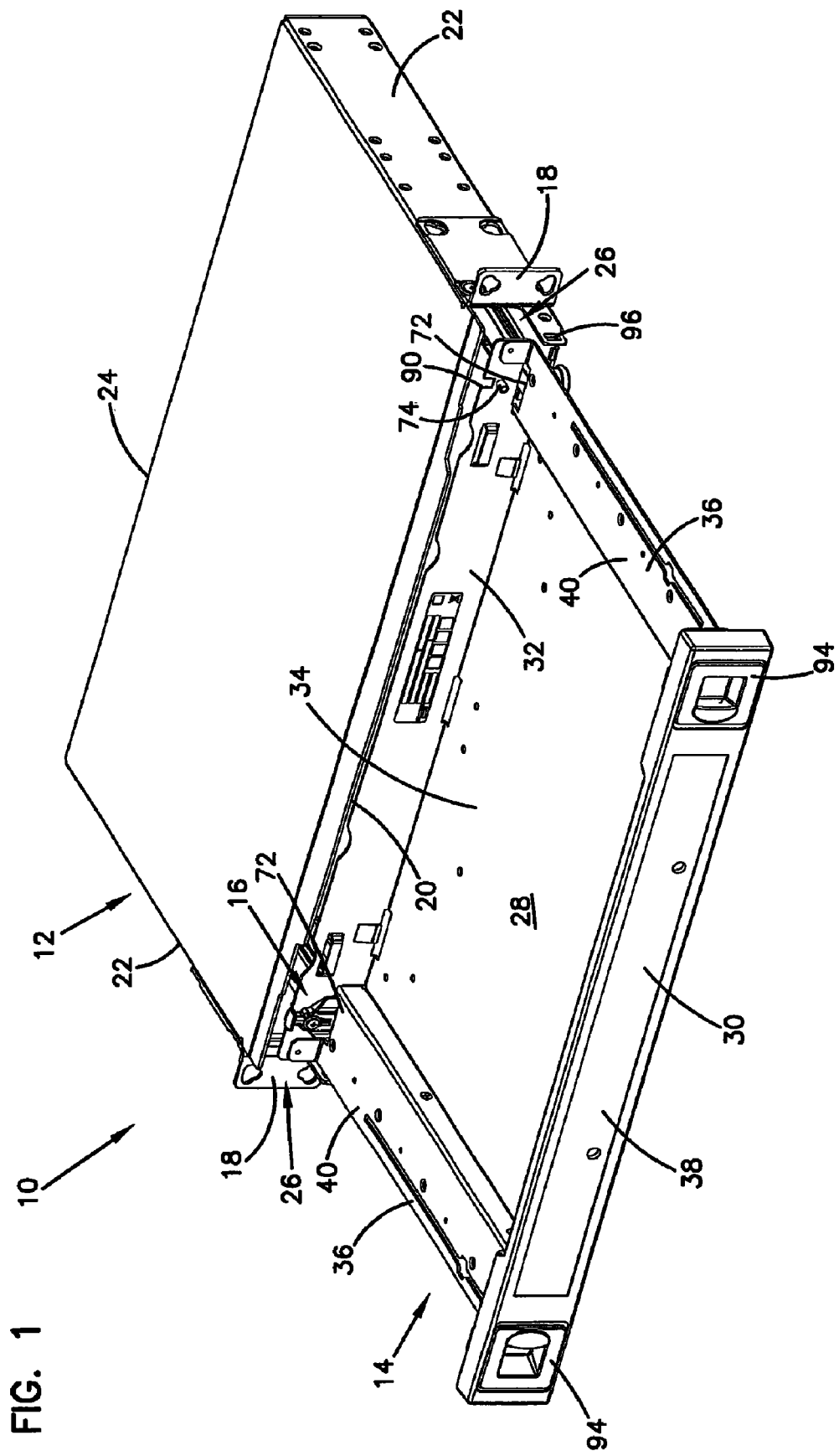
FIG. 1 is a front perspective view of one embodiment of a cable management panel assembly having a rear drawer latch assembly in accordance with the principles disclosed.
Figure 12:
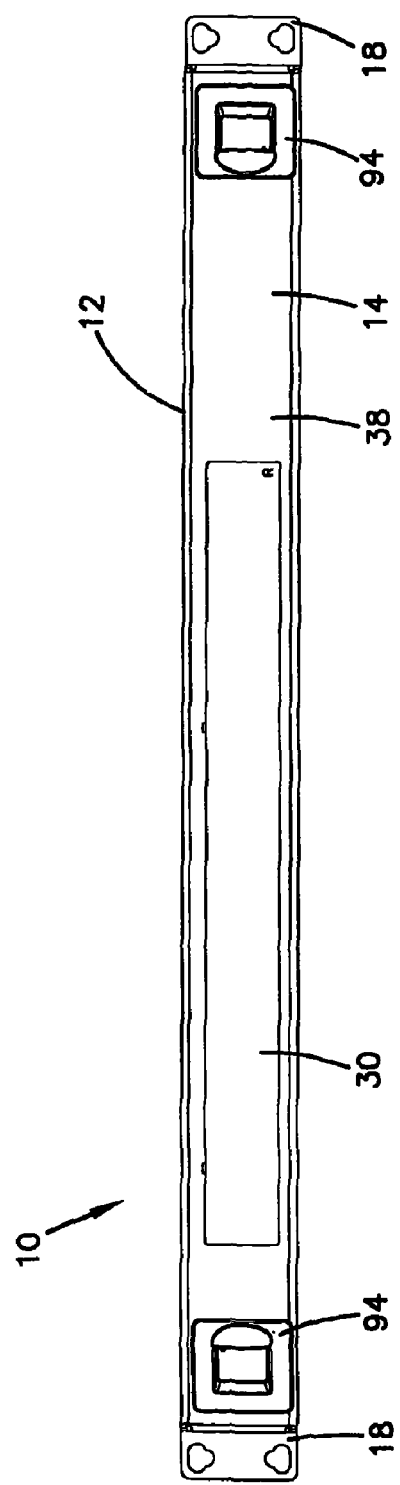
FIG. 12 is a front elevation view of the cable management panel of FIG. 1, shown with the drawer in the closed position.

FIG. 1 illustrates one embodiment of a cable management panel 10 in accordance with the principles disclosed. The cable management panel 10 generally includes a frame or chassis 12, a drawer 14 slidably mounted to the chassis 12, and a rear drawer latch assembly 16. The drawer 14 slides between a closed position (FIG. 12) and an open position (FIG. 1) relative to the chassis 12. The rear drawer latch assembly 16 is designed to prevent the drawer 14 from inadvertently closing when the drawer is positioned in the open position.

The chassis 12 of the disclosed cable management panel 10 includes mounting brackets 18. The mounting brackets 18 are used to mount the panel 10 to a telecommunication structure, such as a telecommunication rack or frame. Details of an example mounting bracket arrangement that can be used in accordance with the principles disclosed are described in U.S. Pat. No. 7,171,099, the disclosure of which is incorporated herein by reference. The cable management panel 10 can also be configured for mounting within a cabinet or enclosure.

The chassis 12 of the cable management panel 10 has a front 20, opposite sides 22, and a rear 24. The sides 22 define cable access openings 26 through which cables are routed into or out from the chassis 12.

Referring still to FIG. 1, the drawer 14 of the cable management panel 10 has a front 30, a rear 32, a bottom tray 34, and sides 36. The front 30 of the drawer 14 is defined by an upright front drawer panel 38. The upright front drawer panel 38 encloses an interior region 28 of the drawer 14 when the drawer is in the closed position. Front latches 94 are provided on the front drawer panel 38 adjacent to both sides 36 of the drawer 14. The front latches 94 secure the drawer 14 in the closed position by engaging side holes 96 located in the sides 22 of the chassis 12.

In the illustrated embodiment, the sides 36 of the drawer 14 are open; the sides 22 of the chassis 12 being constructed to enclose the interior region 28 of the drawer 14 when the drawer is in the closed position. The open sides 36 of the drawer 14 are generally defined by horizontal side plates 40. The open sides 36 allow cables to enter and exit the drawer, and prevent cable damage during sliding movement of the drawer 14. Radius limiters (not shown) can be located at the sides 36 of the drawer 14 to manage the exiting and entering cables during drawer movement. Further details of example radius limiters and radius limiter assemblies that can be used in the present cable management panel are described in U.S. Pat. Nos. 6,438,310; 6,504,988; and 7,079,744; the disclosures of which are each incorporated herein by reference.

The cable management panel 10 can contain a variety of cable management elements (not shown). The cable management elements can be mounted to the bottom 34 of the drawer 14, or mounted on a tray or insert that drops into the interior region 28 of the drawer. Further details of an example drop-in tray that can be used in the present cable management panel 10 are described in U.S. Publication No. 2007/0031099; which is incorporated herein by reference.

The variety of cable management elements that the cable management panel 10 may contain include cable retainers, splice trays, and adapter or connector holders to which fiber optic cables are terminated. Examples of other cable management elements include other constructions, assemblies, and devices for storing cables or connecting the cables to other cables; and/or other fiber optic devices, such as attenuators, couplers, switches, wave division multiplexers (WDMs), and splitters/combiners. The U.S. patents and applications previously incorporated herein by reference describe examples of cable management elements and arrangements that can be provided within the interior region 28 of the drawer 14. As can be understood, the drawer 14 can be customized to include numerous forms of cable management elements to accommodate the particular needs of the user.

When the drawer 14 is in the closed position, the cables and cable management devices or elements in the interior region 28 are protected. Access to the cables and devices or elements is provided by sliding the drawer 14 open.

Figure 10:
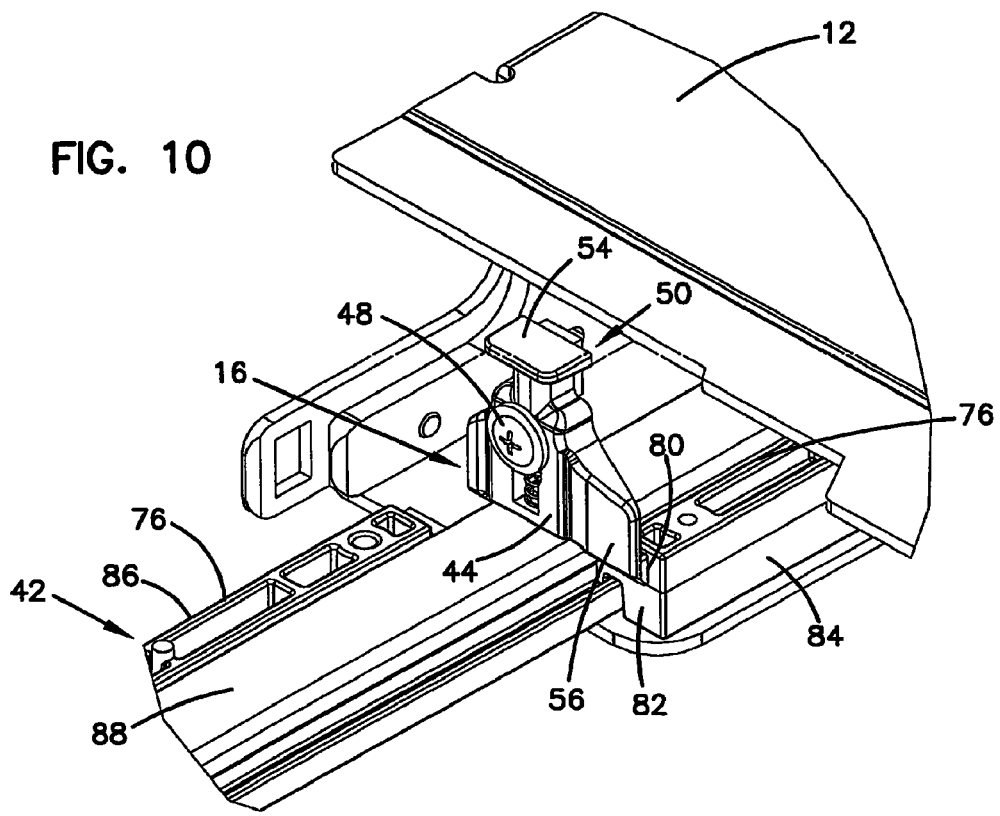
FIG. 10 is a partial perspective view of the cable management panel of FIG. 1, illustrating the rear drawer latch assembly in a locked position, portions of the drawer not shown for clarity.
Figure 11:
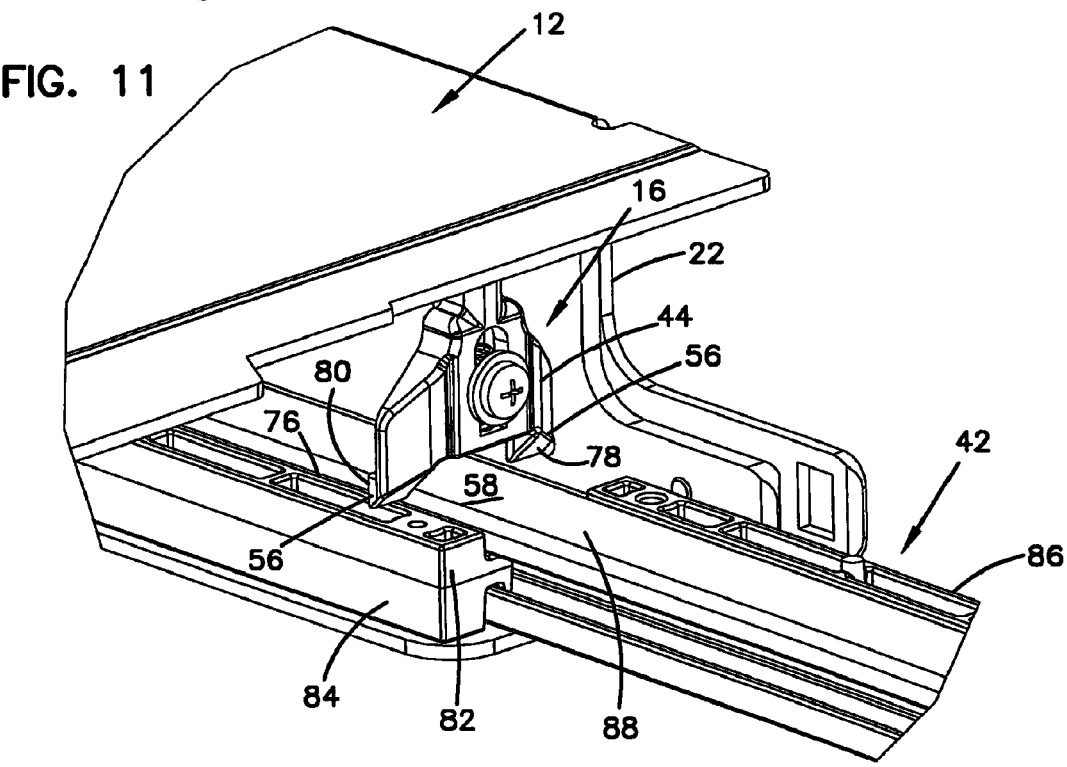
FIG. 11 is a partial perspective view of the cable management panel of FIG. 9, illustrating the right-side rear drawer latch assembly as the drawer of the cable management panel slides from the open position toward the closed position.

The drawer 14 of the present cable management panel 10 slides relative to the chassis 12 via two drawer slide assemblies 42 (partially shown in FIGS. 3 and 10-11). The drawer slide assemblies 42 are located adjacent to the opposite sides 22 of the chassis 12. In the illustrated embodiment, the two drawer slide assemblies 42 each include slide rails (e.g., 84, 86, 88; FIGS. 10 and 11) that side relative to one another. Further details of slide assemblies that can be used in the present cable management panel are described in U.S. Pat. No. 7,171,099 and U.S. application Ser. No. 11/543,457; which applications are incorporated herein by reference.

In general, the cable management panel provides sliding access to cables and components or element located in the interior region 28 of the drawer. Access to the interior region 28 is necessary for maintenance purposes, as well as at the time of installation. During installation or maintenance, the user or technician, for example, routes cables into and out from the drawer, and/or internally routes cables to and from components contained within the drawer. Often times, the cables or components are pulled or pushed, forcing the drawer in a rearward direction. Closing movement of the drawer in the rearward direction can cause damage to cables and/or components not yet completely routed or secured. The presently disclosed drawer latch assembly 16 prevents the drawer 14 from closing and eliminates the occurrence of cable damage and/or component damage due to inadvertent rearward movement.

Referring now to FIGS. 2 and 3, the drawer latch assembly 16 of the panel 10 is located at the rear 32 of the drawer 14. The rear drawer latch assembly 16 generally includes a latch body 44 and a spring 46. A fastening element 48, such as a threaded fastener, is used to secure the drawer latch assembly 16 to the rear 32 of the drawer 14.

Referring now to FIGS. 4-7, the latch body 44 of the drawer latch assembly has a first end 50 and an opposite second end 52. A handle 54 is located at the first end 50 of the latch body; while feet 56 are located at the second end 52 of the latch body. The latch body 44 further includes shoulders 60 that taper outward from the latch body at the second end 52 of the body. The feet 56 extend downward from the shoulders 60 of the latch body 44. The feet 56 are spaced apart and define a gap 58 there between. Each foot 56 includes a front-facing ramped surface 78 (FIG. 6) and a rear-facing stop surface 80 (FIG. 5). The rear-facing stop surface extends in a direction A (FIG. 7) from the first end 50 of the latch body 44 to the second end 52 of the latch body. The ramped surface 78 is angled relative to the direction A.

Referring now to FIGS. 4 and 5, the latch body 44 has a front side 64 and a back side 66. A locating element 92 is provided on the back side 66 of the latch body 44 adjacent to the first end 50 of the body. The locating element 92 aids in positioning and aligning the drawer latch assembly 16 relative to the drawer 14 (see FIG. 3). A recess 62 (FIG. 5) is also located between the first and second ends 50, 52 of the latch body 44 at the back side 66. The recess 62 has a keyhole portion 68 (FIG. 4) that extends through the front side 64 of the latch body.

As shown in FIGS. 2 and 3, the spring 46 of the rear drawer latch assembly 16 is positioned within the recess 62 of the latch body 44. A spring retaining element 70 (FIG. 5) can be provided to retain or capture the spring within the recess 62. In the illustrated embodiment, the spring retaining element 70 is a pin element located within the recess 62. The pin element has a diameter corresponding to an inside diameter of the spring 46 to aid in retaining the spring 46 within the recess 62 of the latch body 44.

Referring back to FIG. 1, the cable management panel 10 can include only a left-side rear drawer latch assembly 16, only a right-side rear drawer latch assembly (FIGS. 9 and 11), or both left-side and right-side rear drawer latch assemblies. The cable management panel 10 includes rear notches 72 formed in each of the horizontal side plates 40 of the drawer 14. Each of the rear notches 72 is sized to accommodate one rear drawer latch assembly 16. The drawer latch assembly 16 is symmetrically manufactured so that a single rear drawer latch assembly operates in either the left-side rear notch 72 or the right-side rear notch.

Referring now to FIGS. 1 and 3, a fastening boss 74 is located at the rear 32 of the drawer 14 adjacent to each notch 72. A locating aperture (e.g., a locating notch) 90 is formed in the rear 32 of the drawer 14. To secure the rear drawer latch assembly 16 to the drawer 14, the assembly 16 is positioned relative to the fastening boss 74 such that the boss 74 is positioned within the keyhole portion 68 (FIG. 2) of the latch body 44; and such that the locating element 92 of the latch body 44 is positioned within the locating aperture 90 of the drawer. The fastening element 48 (FIG. 10) is then threaded into the fastening boss 74 to secure the drawer latch assembly 16 at the rear 32 of the drawer 14. When the assembly is secured to the drawer, the feet 56 of the drawer latch assembly 16 extend through the notch 72 formed in the horizontal side plate 40.

Figure 8:
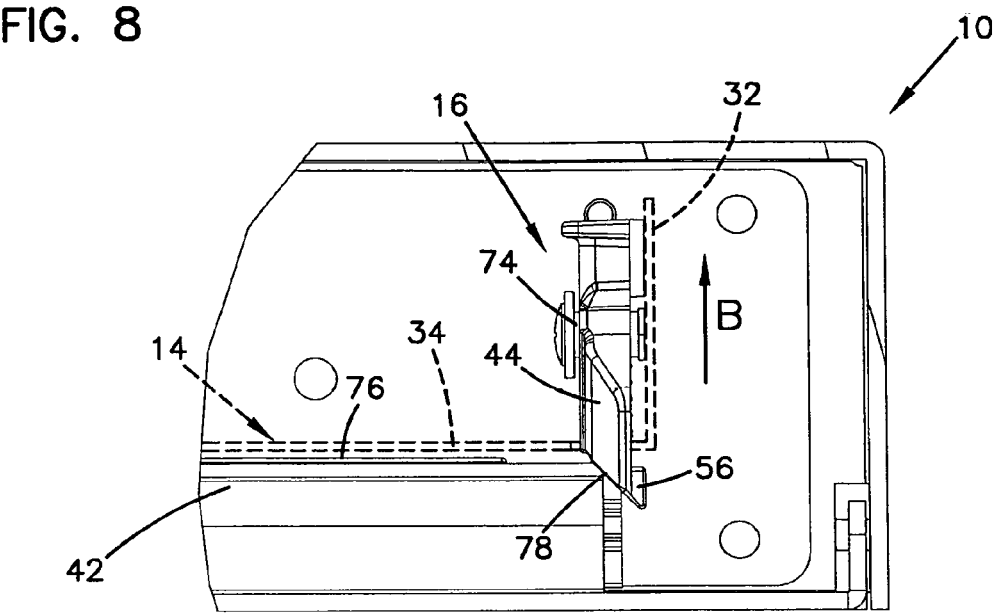
FIG. 8 is a partial side elevation view of the cable management panel of FIG. 1, illustrating movement of the rear drawer latch assembly as a drawer of the cable management panel slides from a closed position toward an open position, portions of the drawer shown schematically for clarity.

Referring now to FIG. 8, the drawer latch assembly 16 is illustrated in relation to the slide assembly 42. The bottom 34 and the rear 32 of the drawer 14 are schematically illustrated for clarity. When the drawer 14 is in the closed position, as shown in FIG. 8, the spring 46 of the drawer latch assembly 16 biases the latch body 44 downward such that the feet 56 are located below or beyond an upper surface 76 of the slide assembly 42. The fastening boss 74 is positioned in an uppermost position within the keyhole portion 68 of the latch body 44 (shown schematically in FIG. 6) and limits the downward position of the body.

Figure 9:
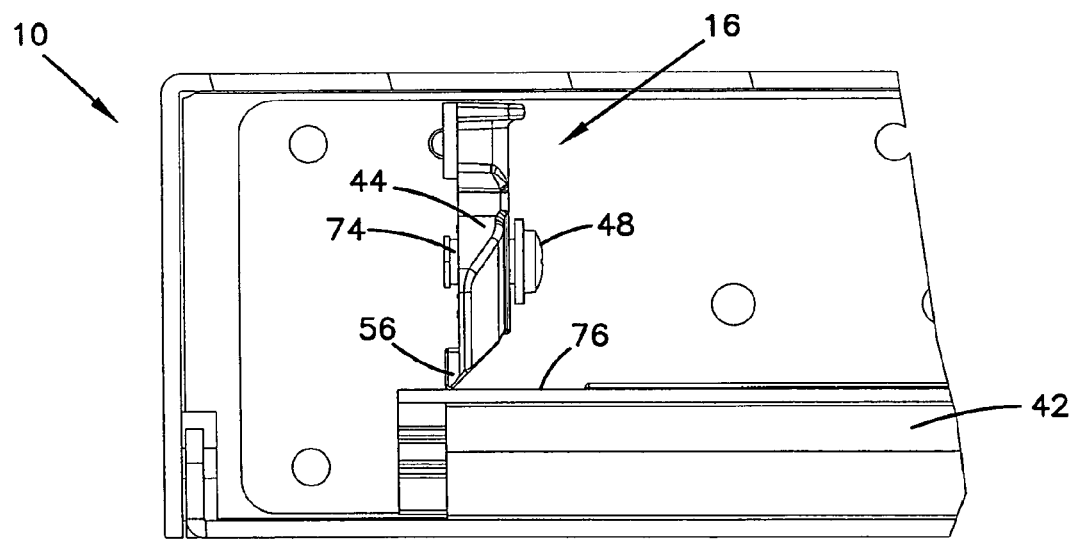
FIG. 9 is a partial side elevation view of the cable management panel illustrating further movement of a right-side rear drawer latch assembly as the drawer of the cable management panel slides toward the open position, portions of the drawer not shown for clarity.

Still referring to FIG. 8, the feet 56 of the drawer latch assembly 16 are located behind the slide assembly 42 when the drawer 14 is closed. Referring now to FIGS. 8 and 9, when the drawer moves from the closed position toward the open position, the ramped surface 78 of one or both feet 56 engage the slide assembly 42 to lift the latch body 44 upward (represented by arrow B in FIG. 8). As can be understood, the fastening boss 74 and the fastening element 48 remain fixed relative to the drawer 14, the keyhole portion 68 of the latch body 44 accommodating the vertical upward movement of the latch body relative to the drawer.

Referring to FIG. 9, as the drawer 14 moves toward the open position, the feet 56 of the drawer latch assembly 16 (illustrate as a right-side latch assembly) slide along the upper or top surface 76 of the slide assembly 42. The fastening boss 74 is positioned in an intermediate position within the keyhole portion 68 of the latch body 44 (shown schematically in FIG. 4) when the feet 56 of the drawer latch assembly 16 contact the top surface 76 of the slide assembly 42.

Upon reaching the open position, the rear drawer latch assembly 16 automatically locks the drawer 14 in the open position to prevent inadvertent closing movement of the drawer. What is meant by "automatically" is that the latch body 44 moves from an unlocked position (i.e., the position at which the drawer latch assembly slides along the top surface of the slide mechanism) to a locked position without a technician having to manually move or manipulate the drawer latch assembly 16. In particular, the spring 56 biases the latch body 44 toward the locked position once the feet 56 of the assembly 16 slide or move forward beyond a front end portion 82 (FIG. 10) of the slide assembly 42.

In the present embodiment, the latch body 44 of the rear drawer latch assembly 16 linearly (i.e., vertically) translates between the unlocked position and the locked position (as opposed to rotating or pivoting between positions). When vertically translating from the unlocked position to the locked position, the fastening boss 74 again limits the downward positioning of the latch body 44 when the boss 74 reaches the uppermost position within the keyhole portion 68 of the body.

Referring now to FIG. 10 (shown without the drawer 14 for purposes of clarity), in the downward locked position, the rear drawer latch assembly 16 is located such that at least one of the feet 56 of the assembly contacts the slide assembly 42 to prevent closing movement of the drawer 14. In particular, the rear-facing stop surface 80 of one of the feet 56 contacts the front end portion 82 of the slide assembly 42. The technician can then proceed with installation or maintenance of cables and other components within the interior region 28 of the drawer 14 without the drawer inadvertently moving rearwards and pinching or damaging the cables and/or drawer components.

Referring still to FIG. 10, the illustrated slide assembly 42 includes first and second outer rails 84, 86 that slide relative to one another. In the drawer open position, the second outer rail 86 is extended outward beyond the location of the rear drawer latch assembly 16. The drawer latch assembly 16 automatically locks due to the downward bias of the spring 46, as neither foot 56 of the latch body is contacting either rail 84, 86 of the slide assembly 46. The latch body 44 thereby seats down through the notch 72 of the drawer 14, as shown in FIG. 2. The gap 58 of the latch body 44 provides clearance for a center railing portion 88 of the slide assembly 42.

To close the drawer 14, the technician manually positions the latch body 44 of the rear drawer latch assembly 16 in the unlocked position. What is meant by "manually" is that the technician is required to physically lift or raise the latch body in a vertical direction. The latch body 44 can be lifted by grasping the handle 54 located at the first end 50 of the body.

In the lifted, unlocked position, the spring 46 is compressed and the feet 56 of the assembly 16 are located above the top surface 76 of the slide assembly 42. The drawer 14 is then free to slide rearward toward the closed position. As illustrated in FIG. 11, once the rear drawer latch assembly 16 is located directly over the top surface 76 of the slide assembly 42, the drawer latch assembly 16 can be released. The foot or feet 56 of the assembly then slide along the top surface 76 of the slide assembly 42 as the drawer (not shown in FIG. 11) moves towards the closed position.

Referring to FIG. 11, when the drawer 14 moves from the open position toward the closed position, the second outer rail 86 of the slide assembly 42 moves toward the location of the drawer latch assembly 16. The front-facing ramped surface 78 of the rightward foot 56, for example, now functions as a guide to accommodate the rearward motion of the second outer rail 86 of the slide assembly 42. That is, in the event the rightward foot 56 of the latch body 44 is not fully positioned above the top surface 76 of the slide assembly 42, the front-facing ramped surface 78 of the foot 56 will aid in further raising the latch body 44 upward.

In general, the rear drawer latch assembly 16 of the disclosed cable management panel 10 is configured to automatically move from an unlocked position to a locked position when the drawer is opened; the drawer latch assembly thereby preventing inadvertent closing movement of the drawer that can otherwise cause damage to cables and/or other components.

The above specification provides a complete description of the present invention. Since many embodiments of the invention can be made without departing from the spirit and scope of the invention, certain aspects of the invention reside in the claims hereinafter appended.

What is claimed is:

1. A method of operating a cable management panel, the method including:
   a) providing a drawer slidably mounted relative to a chassis by a slide mechanism;
   b) sliding the drawer from a closed position to an open position;
   c) automatically locking the drawer in the open position, including biasing a latch body of a rear drawer latch assembly to a locked position that prevents closing movement of the drawer;
   d) lifting the latch body upward to an unlocked position; and
   e) sliding the drawer from the open position to the closed position;
   f) wherein, when sliding the drawer from the closed position to the open position, engaging a ramped surface of the latch body with the slide mechanism and raising the latch body upward and sliding feet of the latch body along a top surface of the slide mechanism as the drawer slides toward the open position.

2. The method of claim 1, wherein the step of lifting the latch body upward includes manually lifting the latch body upward to the unlocked position and thereafter releasing the latch body such that feet of the latch body slide along a top surface of the slide mechanism as the drawer slides toward the closed position.

3. The method of claim 1, wherein the step of lifting the latch body upward includes lifting the latch body vertically upward to the unlocked position.

4. The method of claim 1, wherein the rear drawer latch assembly is located above the slide mechanism as the drawer moves between the open and closed positions.

5. The method of claim 1, wherein the drawer latch assembly includes a spring that biases the latch body toward the locked position.

6. The method of claim 5, wherein the latch body includes a foot that prevents closing movement of the drawer when the latch body is in the locked position.

7. The method of claim 1, wherein the latch body includes a foot that contacts the slide mechanism to prevent closing movement of the drawer when the drawer is locked in the open position.

8. The method of claim 1, further including sliding the latch body along a top surface of the slide mechanism as the drawer slides toward the open position.

9. A method of operating a cable management panel, the method including:
 a) providing a drawer slidably mounted relative to a chassis by a slide mechanism;
 b) sliding the drawer from a closed position to an open position;
 c) automatically locking the drawer in the open position, including biasing a latch body of a rear drawer latch assembly to a locked position that prevents closing movement of the drawer;
 d) manually lifting the latch body upward to an unlocked position; and
 e) sliding the drawer from the open position to the closed position, wherein the step of lifting the latch body upward to the unlocked position releases the latch body such that feet of the latch body slide along a top surface of the slide mechanism as the drawer slides toward the closed position.

* * * * *

UNITED STATES PATENT AND TRADEMARK OFFICE
CERTIFICATE OF CORRECTION

PATENT NO.        : 8,150,229 B2                             Page 1 of 1
APPLICATION NO.   : 12/460034
DATED             : April 3, 2012
INVENTOR(S)       : Krampotich et al.

It is certified that error appears in the above-identified patent and that said Letters Patent is hereby corrected as shown below:

Title page, (75) Inventors: "Bernsville, MN" should read --Burnsville, MN--

Signed and Sealed this
Sixth Day of November, 2012

David J. Kappos
*Director of the United States Patent and Trademark Office*